United States Patent
Dermark

(10) Patent No.: US 9,224,535 B2
(45) Date of Patent: Dec. 29, 2015

(54) HIGH POWER ELECTRICAL DISTRIBUTION SYSTEM

(75) Inventor: Daniel Dermark, Landvetter (SE)

(73) Assignee: SAAB AB, Linköping (SE)

( * ) Notice: Subject to any disclaimer, the term of this patent is extended or adjusted under 35 U.S.C. 154(b) by 627 days.

(21) Appl. No.: 13/516,984

(22) PCT Filed: Dec. 16, 2009

(86) PCT No.: PCT/SE2009/051435
§ 371 (c)(1),
(2), (4) Date: Jun. 18, 2012

(87) PCT Pub. No.: WO2011/075021
PCT Pub. Date: Jun. 23, 2011

(65) Prior Publication Data
US 2012/0256482 A1    Oct. 11, 2012

(51) Int. Cl.
*H01F 38/18*    (2006.01)
*H01Q 3/02*    (2006.01)
*G01S 13/02*    (2006.01)

(52) U.S. Cl.
CPC .................. *H01F 38/18* (2013.01); *H01Q 3/02* (2013.01); *G01S 2013/0245* (2013.01); *Y10T 307/297* (2015.04)

(58) Field of Classification Search
CPC ... G01S 7/032; G01S 13/931; G01S 13/4463; G01S 2013/0245; H01F 38/18; H01Q 3/02
USPC ..................................... 342/175, 195; 307/17
See application file for complete search history.

(56) References Cited

U.S. PATENT DOCUMENTS

| | | | |
|---|---|---|---|
| 3,317,873 A | | 5/1967 | Himmelstein et al. |
| 4,649,390 A | * | 3/1987 | Andrews et al. ............... 342/140 |
| 5,010,314 A | * | 4/1991 | Estrov ........................... 336/198 |
| 5,521,444 A | | 5/1996 | Foreman |
| 5,805,115 A | | 9/1998 | Pellerin et al. |
| 6,087,985 A | * | 7/2000 | Rummeli et al. ............. 342/359 |

(Continued)

FOREIGN PATENT DOCUMENTS

EP    0860936 A2    8/1998

OTHER PUBLICATIONS

Skolnik, Merrill I., and editor in chief. Radar Handbook. 3rd ed. New York: McGraw-Hill Professional, 2008. p. 13.63-13.65.*
Chen, Ping, and Ashoka Bhat. "Analysis and Design of a Soft Switched Ac-Dc Converter Operating in Dcm." HAIT Journal of Science and Engineering 2, No. 3 (Mar. 1, 2006): 327-51. Accessed Dec. 8, 2014. http://people.clarkson.edu/~nanosci/jse/B/vol0236B/jse06.pdf.*

(Continued)

*Primary Examiner* — Matthew M Barker
(74) *Attorney, Agent, or Firm* — Venable LLP; Eric J. Franklin

(57) ABSTRACT

A high power electrical distribution system for distribution high power to at least one consumer arranged on a rotatable element. The distribution system includes at least one high frequency alternating current HFAC generator configured to generate HFAC. A rotary power transformer is connected to the at least one HFAC generator. The rotary power transformer includes a stationary part and a rotatable part and is configured to receive HFAC from the at least one HFAC generator and to couple HFAC electrical energy from the stationary part to the rotatable part. At least one high power distribution bus is located on the rotatable element and is configured to receive HFAC from the rotary power transformer and to distribute HFAC to the at least one consumer.

5 Claims, 2 Drawing Sheets

(56) References Cited

U.S. PATENT DOCUMENTS

| | | | | |
|---|---|---|---|---|
| 6,801,027 | B2* | 10/2004 | Hann et al. | 323/282 |
| 6,856,283 | B2* | 2/2005 | Jacobson et al. | 342/368 |
| 6,882,260 | B2* | 4/2005 | Katzir et al. | 336/200 |
| 6,900,717 | B2* | 5/2005 | Timashov et al. | 336/208 |
| 7,262,679 | B2* | 8/2007 | Mehdizadeh et al. | 336/84 R |
| 7,365,696 | B1* | 4/2008 | Smeltzer | 343/757 |
| 8,164,929 | B2* | 4/2012 | Zimpfer | 363/34 |
| 8,184,059 | B2* | 5/2012 | Bunch et al. | 343/766 |
| 2004/0061380 | A1* | 4/2004 | Hann et al. | 307/43 |
| 2008/0298298 | A1* | 12/2008 | Eom et al. | 370/316 |
| 2009/0276199 | A1* | 11/2009 | Krumme et al. | 703/7 |

OTHER PUBLICATIONS

Borkowski, Michael. Solid-State Transmitters. N.p.: Artech House, Incorporated, 2008. forum.helitavia.com. p. 5.25.*
PCT/ISA/210—International Search Report—August 16, 2010.
PCT/ISA/237—Written Opinion of the International Searching Authority—August 16, 2010.
PCT/IPEA/409—International Preliminary Report on Patentability—November 24, 2011.

* cited by examiner

HIGH POWER ELECTRICAL DISTRIBUTION SYSTEM

CROSS-REFERENCE TO RELATED APPLICATIONS

This is the national phase under 35 U.S.C. §371 of PCT/SE2009/051435 filed 16 Dec. 2009.

TECHNICAL FIELD

The present invention relates to a high power electrical distribution system for supplying high power to a consumer on a rotatable element, particularly a rotatable antenna, and more particularly a rotatable radar antenna for use in an electronic system having widely dispersed consumers, such as a phased-array radar system.

BACKGROUND ART

The electrical distribution system for a rotating antenna including multiple consumers according to the prior art comprise an AC/DC bulk power converter being supplied with AC from a main supply. The AC/DC bulk power converter subsequently feeds a rotary power transfer device including a slip ring module with DC, for example 56 V DC, which is transferred to a distribution bus located on the rotating antenna by means of the slip ring module in the rotary power transfer device. Finally, the distribution bus distributes the supplied DC to DC/DC power converters located on the antenna, which power converters transform the supplied DC to a DC suitable for the specific consumers.

Such a distribution system is known from patent document U.S. Pat. No. 5,805,115 A.

This type of electrical distribution system according to the prior art has a number of disadvantages:

The slip ring module for transferring power from a stationary part to a rotary part of the rotary power transfer device comprises a brush, which is in electrical contact with a slip ring. During rotation between the stationary and rotary part, the brush slides on the slip ring whilst transferring electrical power. Hence, abrasion occurs between the brush and the slip ring, which requires increased maintenance of the power transfer device. Moreover, the data transmission capacity of the slip ring module is also affected by a number of factors, like humidity, temperature and rotation speed, such that data transmission speed and accuracy over the slip ring module can be improved.

The distribution system comprises DC/DC power converters that modify the DC of the distribution bus to the specific requirements of the consumers. The DC/DC power converters have relatively high power losses, which also increases antenna cooling requirements. The weight of each DC/DC power converter is also relatively high, which in combination with many consumers and many DC/DC power converters result in a significant weight of the antenna. The mean time between failures MTBF of the distribution system is also high due to the structure and function of each DC/DC power converter.

There is thus a need for an improved electrical distribution system removing the above mentioned disadvantages.

SUMMARY OF THE INVENTION

The object of the present invention is to provide an inventive high power electrical distribution system for distribution high power to at least one consumer arranged on a rotatable element. The object is achieved by a distribution system that includes at least one high frequency alternating current HFAC generator configured to generate HFAC. The distribution system further comprises a rotary power transformer including a stationary part and a rotatable part. The rotary power transformer is configured to receive HFAC from said at least one HFAC generator, and to couple HFAC electrical energy from said stationary part to said rotatable part. The distribution system further comprises at least one high power distribution bus located on said rotatable element. The high power distribution bus is configured to receive HFAC from said rotary power transformer and to distribute HFAC to said at least one consumer.

Another object of is to provide an inventive method for distributing high power to at least one power consumer arranged on a rotatable element. This object is achieved by a method that includes the steps of generating HFAC in at least one HFAC generator, and transferring HFAC supplied by said at least one HFAC generator to said rotatable element by means of a rotary power transformer. Said rotary power transformer includes a stationary part and a rotatable part. Finally, said transferred HFAC from said rotary power transformer is distributed to said at least one consumer by means of at least one high power distribution bus located on said rotatable element.

The subject-matter of embodiments of the invention results in a number of advantages. A rotary power transformer has an improved reliability and reduced maintenance requirement compared with a rotary power transfer device including a slip ring module. By operating the rotary power transformer at high frequency, the rotary power transformer can also be made physically more compact and light, because of the reduced amount of required ferromagnetic core. Moreover, the power loss in the distribution chain is reduced, because HFAC can be transformed to DC suitable to a consumer in a simplified manner.

BRIEF DESCRIPTION OF THE DRAWINGS

The present invention will now be described in detail with reference to the figures, wherein.

DETAILED DESCRIPTION

In the following an embodiment of the invention is shown and described, simply by way of illustration of one mode of carrying out the invention.

Figure 1:
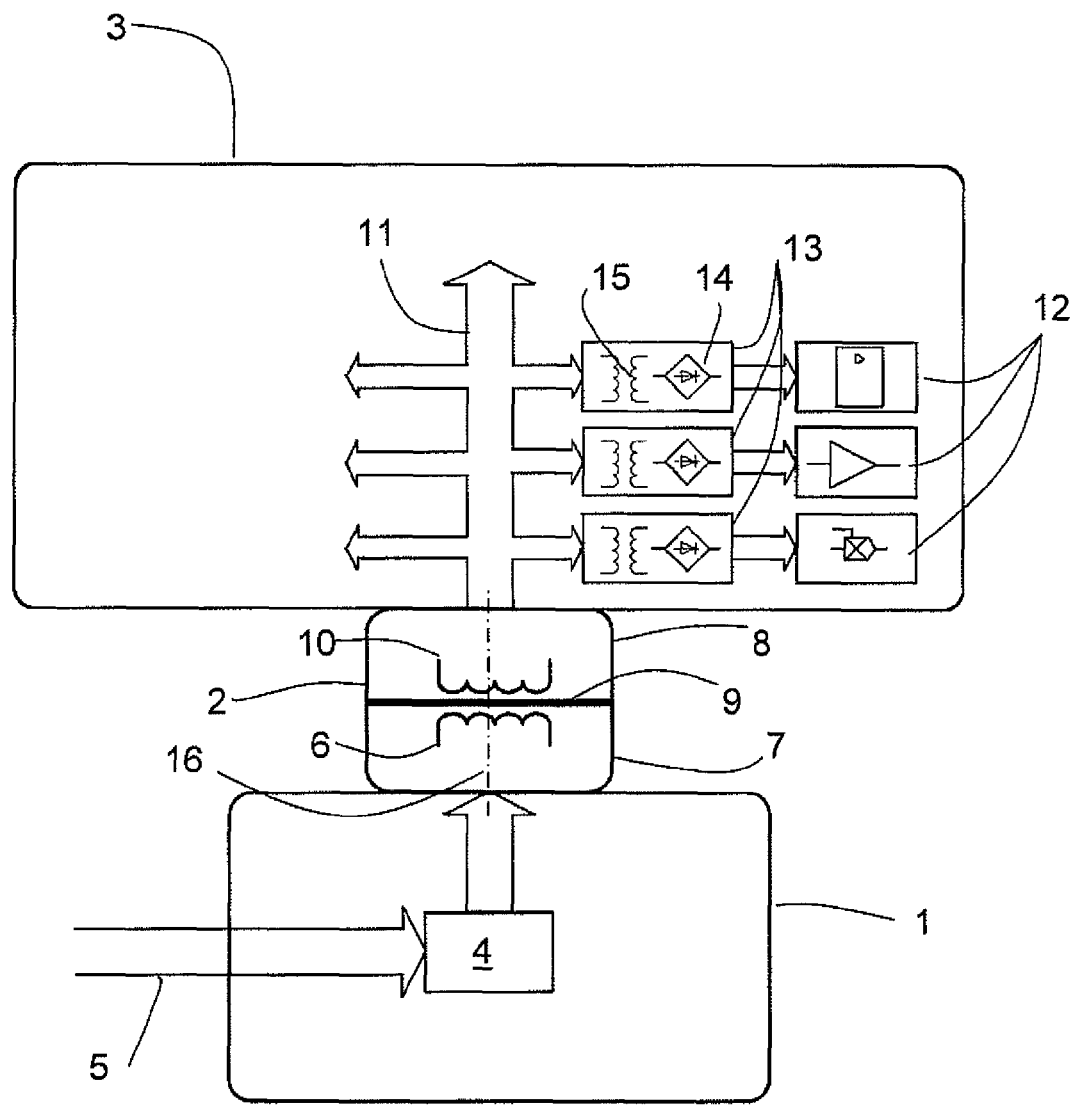
FIG. 1 shows a high power distribution system according to the invention.

FIG. 1 shows a high power electrical distribution system according to an embodiment of the invention. Said distribution system comprises three main parts: a static part 1, a rotary power transformer 2, and a rotating element 3. The static part 1 includes a HFAC generator 4, which can either be grid-connected and configured to receive electrical power from an ac main supply by a single phase or polyphase ac line 5, or be a stand-alone HFAC power generator 4, which is configured to be mechanically driven, for example by some type of combustion unit such as a gas turbine etc, for generating HFAC. It is also possible to foresee multiple HFAC generators 4 connected in parallel, because such an arrangement has the advantage of being less vulnerable to generator failure since the rest of generators will continue to supply HFAC.

Another advantage of multiple HFAC generators 4 is the possibility to supply multiple HFAC outputs with differing voltage level and/or frequencies. The HFAC generator 4 can for example use a Class D amplifier, which is suitable for generating power levels above 1 kW, preferably above 10 kW, and AC frequencies preferably about 100 kHz, but also up to 1 MHz or more. Such HFAC generators are well-known in the prior art.

Next, HFAC power from the HFAC generator 4 is applied to a primary winding 6 of the rotary power transformer 2. Electromotive force is induced in a secondary winding 10 that is provided in a rotary part 8 by the HFAC flowing through the primary winding 6. The rotary power transformer 2 is configured to provide an HFAC output of at least 1 kW, and preferably of at least 5 kW, and more preferably of at least 10 kW. The primary winding 6 is located in a static part 7 of the rotary power transformer 2, while the secondary winding 10 is located in the rotary part 8, wherein said static and rotary parts 7, 8 are divided by a rotating intersection 9.

A high power distribution bus 11 is provided on said rotatable element 3 for distributing HFAC to consumers 12 disposed on the rotatable element 3. Said high power distribution bus 11, which connects the secondary winding 10 of the rotary power transformer 2 with the consumers 12 either directly, or via one or more power converters 13, can be formed of a heavy-duty metal bar. The size, form and material of the high power distribution bus 11 is selected to be suitable for distributing high frequency high power AC to the consumers 12 and/or power converters 13 of at least 1 kW, and preferably at least 5 kW, and more preferably at least 10 kW.

Depending on what type of power the consumers 12 require, power converters 13 can be provided to convert the distributed HFAC to the power required. If for example one or more consumers 12 require DC with a specific voltage, a power converter 13 comprising a voltage transformer 15 and rectifier unit 14 is provided in front of said one or more consumers 12. In case said one or more consumers 12 require AC, for example a heating element, no rectifier unit 14 is necessary. In addition to the power converters 13, the consumers 12 themselves may be provided with additional power converting means, for example on a printed circuit board of said consumers 12. Each power converter 13 can either supply a single consumer 12, or multiple consumers 12, all depending on the specific adaptation of the invention.

The rotary power transformer 2 may also comprise multiple pairs of primary and secondary windings positioned along a common rotary shaft 16, where each pair of windings has a separate core, and is used to couple a single current and/or control signal. The turn ratio of each pair of windings may be different to provide impedance matching or voltage step-up or step-down. Moreover, this might also be combined with multiple HFAC generators 4, such that each pair of windings can be supplied with HFAC having a unique voltage level and/or frequency. Correspondingly, the rotatable element 3 may also comprise multiple high power distribution buses 11 connected to said multiple pair of windings for optimised power distribution to different type of consumers 12.

The high power distribution bus 11 can also be configured to provide a signal system, which transmits control signals from a static control unit to a control unit in the rotating element, and/or oppositely. The signal system is similar in configuration and operation to the power system. A control signal generated in the static control unit is applied to the primary winding 6 that is provided in the static part 7. Since the secondary winding 10 is electromagnetically coupled to the primary winding 6, electromotive force is induced in the secondary winding 10 by the control signal flowing through the primary winding 6 and is supplied to a control unit disposed on the rotatable element 3 and connected to the high power distribution bus 11. Alternatively, a separate signal bus might be provided on the rotatable element 3.

The invention can be adapted for many different types of applications where a high power distribution system for a rotatable element 3 is desired. One specific example relates to rotatable sensor 3 or rotatable antenna 3 having multiple consumers 12. More specifically, the rotatable element 3 can be a rotating radar antenna 3 of a phased-array radar system, which normally has widely dispersed consumers 12. In such an application, the consumers 12 are mainly the active antennas and their phase shifters, phase shifter controllers, receiver amplifiers, transmitting power amplifiers, auxiliary control or signal processing devices, or the like. The active antennas of a phased array radar system are often arranged in rows and columns on the radar antenna 3, and they normally require DC at a predetermined voltage level, which is supplied by power converters 13. Each power converter 13 normally supplies power to at least one consumer 12, and preferably at least 20 separate consumers 12, and more preferably at least 100 separate consumers 12, and said rotatable radar antenna 3 includes more than 100 separate consumers 12, and preferably more than 500 separate consumers 12, and more preferably more than 1000 separate consumers 12.

The main inventive idea behind the invention is the combination of distributing HFAC to the rotatable element 3, and replacing the slip ring module based rotary power transfer device according to the prior art with a rotary power transformer 2. This particular inventive combination results in a number of advantages:

The rotary power transformer due to its inherent contactless power transfer capability has an improved reliability and reduced maintenance requirement compared with a rotary power transfer device including a slip ring module. It is also less dependent on external factors such as humidity, temperature and rotation speed, such that data transmission speed and error rate is improved by means of the rotary power transformer. By operating the rotary power transfer at high frequency, the rotary power transformer can also be made physically more compact and with reduced weight, because a given ferromagnetic core is able to transfer more power without reaching saturation when the frequency is increased. Hence, the magnetic core of a high frequency rotary power transformer can be made relatively small and light, and the need for heavy ferrite structures is avoided.

By distributing HFAC to the rotatable element instead of DC, a number of additional advantages are provided. One of them being reduced power losses in the distribution chain, because HFAC can be transformed to DC suitable to the consumer in simplified manner.

Figure 2:
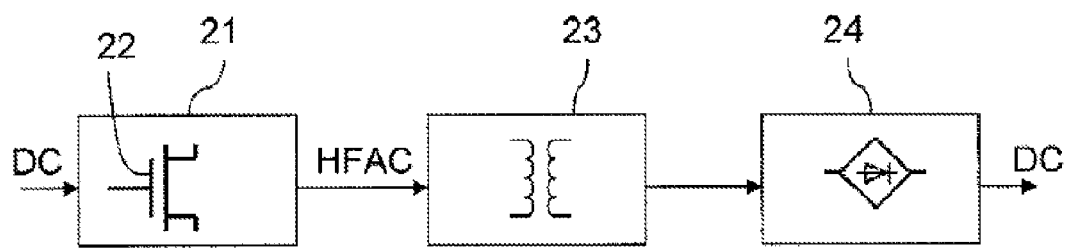
FIG. 2 shows a DC/DC power converter according to the prior art.

In the prior art, DC was generated in the static part outside the rotatable element, and subsequently distributed to consumers in the rotatable element by means of said slip ring module based power transfer device and a distribution bus. In case the consumer required a different DC than that distributed by the distribution bus, a DC/DC power converter was needed. FIG. 2 shows a schematic view of a DC/DC power converter according to the prior art. DC is fed to an inverter stage 21 comprising a primary switching element 22, e.g. a field effect transistor FET, or MOSFET on the primary side of a high frequency transformer 23. The primary switching element 22 operates at high frequency and supplies a chopped DC, i.e. inverted AC to drive the primary winding of the high-frequency transformer 23. This converts the voltage up or down to the required output level on its secondary winding.

Finally, the AC output from the high frequency transformer 23 is rectified by a rectifying unit 24, and possibly smoothed by an additional filter consisting of inductors and capacitors.

Consequently, due to the multiple power conversion steps (DC→HFAC→transformed HFAC→DC), the power losses are relatively high, which also increases antenna cooling requirements. The weight of each DC/DC power converter is also relatively high, which in combination with many consumers and DC/DC power supplies results in a significant weight of the antenna. The mean time between failures MTBF of the distribution system is also high due to said multiple converting structures of each DC/DC power converter and the need for extra filtering circuits.

Figure 3:
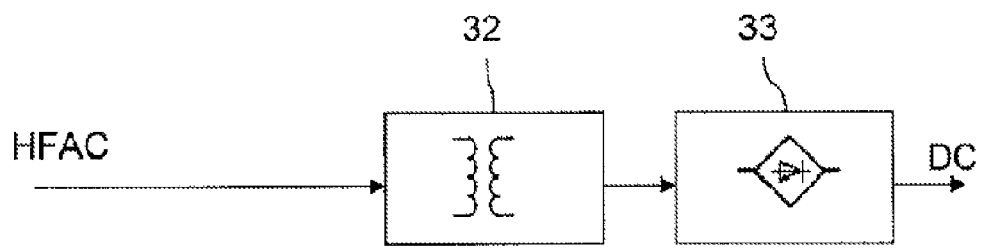
FIG. 3 shows a HFAC/DC power converter according to the invention.

Transforming HFAC to required DC can however be performed with one conversion step less (HFAC→transformed HFAC→DC). This is schematically illustrated in FIG. 3, where HFAC is fed directly to the primary winding of a high-frequency transformer 32, which converts the voltage to the required consumer voltage level on its secondary winding. Said transformed HFAC is subsequently rectified by a rectifying unit 33, and possibly smoothed by an additional smoothing filter. Hence, the first step of transforming DC to high frequency AC by means of primary switches 22 in an inverter stage 21 is omitted, which leads to reduced power losses, improved power conversion efficiency, and increased MTBF, since the primary switches 22 are prone to failure. As a result of said reduced power losses in the power conversion, which takes place in the antenna, antenna cooling requirements is also reduced, which simplifies design and manufacturing of the antenna, improves antenna reliability due to reduced provision of cooling system, and reduced antenna cooling system maintenance.

The primary switches 22 of a DC/DC power converter also produces high amount of electromagnetic interference EMI as well as radio frequency interference RFI due to the current being switched on and off sharply. Therefore, EMI filters and RF shielding are needed to reduce said interference before supplying the converted DC to the consumer. By means of the inventive high power distribution system and method however, a pure or nearly pure sinusoidal voltage can be generated by the HFAC generator 4, and subsequently distributed to the power converters 13 and/or consumers 12. Distributing a pure or nearly pure sinusoidal voltage throughout the high power distribution system removes many problems associated with interference and ground currents. Moreover, when converting HFAC to DC, no inference is produced due to lack of primary switches, which consequently reduces the filtering and shielding requirements, and thus also power losses otherwise occurring in said filtering and shielding step.

High frequency AC (HFAC) power distribution systems concern the delivery of power at multi-kHz frequency via electric cables/buses. At high frequencies, conductor path lengths and characteristics of the conductors play a significant role for the AC distribution. Thus, for HFAC appropriate technologies are used. Known technologies designed for use with lower frequencies generally are not directly usable for high frequency applications.

An electrical distribution system distributing "high power" is considered to encompass all different kinds of electrical distribution systems suitable for distribution of at least 1 kW from a main supply to a consumer.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A high power electrical distribution system for distribution of high power to a plurality of consumers arranged on a rotatable element, said distribution system comprising:
   at least one high frequency alternating current (HFAC) generator configured to generate HFAC having an AC frequency of at least 10 kHz,
   a rotary power transformer connected to said at least one HFAC generator, wherein said rotary power transformer includes a stationary part and a rotatable part, and is configured to receive HFAC from said at least one HFAC generator, and to couple HFAC electrical energy from said stationary part to said rotatable part,
   at least one high power distribution bus located on said rotatable element, and configured to receive HFAC from said rotary power transformer and to distribute HFAC to said plurality of consumers, and
   a plurality of power converters arranged on said rotatable element, wherein each power converter is configured to receive HFAC from said at least one high power distribution bus, to supply a subset of the plurality of consumers, and to convert said received HFAC to an electrical power form suitable for the subset of consumers that the power converter supplies,
   wherein each power converter comprises a transformer unit or a transformer/rectifier unit configured to supply transformed AC or DC to the subset of consumers, wherein said rotatable element is a rotating radar antenna of a phased-array radar system, wherein said rotatable element includes more than 100 separate consumers, and wherein the rotary power transformer is configured to provide an HFAC output of at least 1 kW to said at least one high power distribution bus.

2. The high power electrical distribution system according to claim 1, wherein said rotatable element is a radar antenna, and wherein said plurality of consumers comprise a phase shifter, a phase shifter controller, a receiver amplifier, a transmitting power amplifier or an auxiliary control or signal processing device.

3. The high power electrical distribution system according to claim 1, wherein said rotary power transformer is configured to feed at least two separate high power distribution buses, such that said at least two distribution buses distribute HFAC having at least one of different AC frequency or different power levels, or such that said at least two distribution buses provide redundancy by distributing identical HFAC in said at least two separate high power distribution buses.

4. A method for distributing high power to a plurality of consumers arranged on a rotatable element, said method comprising:
   generating high frequency alternating current (HFAC) having an AC frequency of at least 10 kHz in at least one HFAC generator,
   transferring HFAC supplied by said at least one HFAC generator to said rotatable element utilizing a rotary power transformer, wherein said rotary power transformer includes a stationary part and a rotatable part,
   distributing said transferred HFAC from said rotary power transformer to said plurality of consumers utilizing at least one high power distribution bus located on said rotatable element,
   receiving HFAC from said at least one high power distribution bus with a plurality of power converters arranged on said rotatable element, and
   converting said received HFAC to an electrical power form suitable for said plurality of consumers, wherein each power converter comprises a transformer unit or a transformer/rectifier unit that supplies transformed AC or DC to a subset of said plurality of consumers, wherein said rotatable element is a rotating radar antenna of a phased-array radar system, and said rotatable element includes more than 100 separate consumers, and wherein said supplied HFAC by said rotary power transformer to said at least one high power distribution bus has an output power of at least 1 kW.

5. The method according to claim 4, wherein said rotary power transformer feeds at least two separate high power distribution buses, such that said at least two distribution buses distribute HFAC having at least one of different AC frequency or different power levels, or such that said at least two distribution buses provide redundancy by distributing identical HFAC in said at least two separate high power distribution buses.

* * * * *